Patented Nov. 5, 1935

2,019,619

UNITED STATES PATENT OFFICE 2,019,619

FIRE-CLAY SEWER-PIPE BODY

Willard K. Carter and George H. Duncombe, Jr., Columbus, Ohio, assignors to National Aluminate Corporation, Chicago, Ill., a corporation of Delaware No Drawing. Application July 13, 1934, Serial No. 734,994

3 Claims. (Cl. 106—11)

The present invention relates to an improvement in ceramic ware, particularly as exemplified by fire-clay sewer-pipe bodies and similar structures.

One of the primary objects of the invention is to improve ceramic ware so as to overcome its tendency toward loss in strength as the result of exposure to the elements.

A further object of the invention is the improvement of ceramic ware, such as fire-clay sewer-pipe, particularly of the glazed variety, to overcome the loss in strength to which such material is prone as the result of exposure to weather, which loss in strength often is so great as to render the material useless for the purposes for which it is intended.

The principle of the invention is predicated upon the use of a water-soluble aluminate, such as sodium aluminate, of which a small quantity, say up to 1%, is added to the clay during the working thereof.

The invention is based upon the following considerations: All ceramic products are subject to a certain amount of deterioration upon aging, particularly if during this period the products are exposed to temperature and humidity variations. While many ceramic products possess sufficient strength at the time of their manufacture, it often happens that after a period of storage—which may be from a few weeks to several years,—the products will have deteriorated at the end of such time to such a point as to render them unfit for the intended purposes and, in many cases, no longer up to the specifications demanded of such products.

One of the most notable examples of such deterioration of ceramic products occurs in the case of clay sewer-pipe, in the form of loss of strength, and in some cases even to the point of partial distintegration. As a result of such deterioration, which may be spoken of as "weathering," manufacturers and consumers of these products suffer huge monetary losses in labor and stock, and consumers are caused to turn to competitive forms of products in preference to ceramic products which are subject to such weathering losses. The effect is particularly noticeable in the case of salt glazed sewer-pipe, the loss in strength in some cases running up to 40%, which, as will readily be appreciated, is a very serious item. Numerous theories have been proposed to account for this loss in strength, but none of them appears to be completely satisfactory. It is barely possible that the loss is due to a deterioration of the glass-like bond which exists in such ware as the result of the firing thereof in the course of manufacture. When initially made, this glass-like bond is strong because the solid solution of the various ingredients to form a glass has taken place; but on storage it is possible that deterioration of the glass occurs, with resultant loss in strength of the bond. This theory, however, is almost incapable of proof and is merely introduced as a suggestion in an attempt to explain an otherwise well established phenomenon.

The inventors have, however, discovered that this loss in strength can be very greatly reduced by incorporating with the clay ware, at some stage during its manufacture prior to burning, a relatively small amount of sodium aluminate, as a result of which addition deterioration resulting from weathering is very greatly diminished.

One of the outstanding advantages of the present invention lies in the fact that no changes whatever need be made in the manufacturing technology of the products. Thus the tempering, forming and drying need not be altered in order to obtain the benefit of the invention, but there may be slight changes in the time and temperature relationship during the firing operation; for example, glazed ware made under carefully controlled testing conditions will normally show a loss up to almost 40% of the strength of the original ware, while the identical material made in the identical way, with the exception of the addition of up to 1% of sodium aluminate, will show a weathering loss of possibly only 15% of the original strength. In unglazed ware, the deterioration, contrary to what would be expected, is usually less than in glazed ware, showing that the glaze has some deteriorating effect upon the vitreous bond of the ware. Thus, unglazed ceramic ware may show a loss up to 24% of its original strength as a result of weathering, but with the addition of 1% of sodium aluminate this loss can be brought down to but a few per cent. The amount of sodium aluminate used may range from 0.05% up to, say, 1% or more, although usually additions of 0.25% to 1.0% give the most satisfactory results. Larger amounts of sodium aluminate are counterindicated, and may lead to the production of undesirable results, such as the formation of an efflorescence of the product due to the migration of sodium compounds to the surface.

The preferred method of adding the sodium aluminate is to add it in solution in the tempering water, but obviously it may be introduced dry with the clay, prior to or simultaneously with, or even after, the addition of the tempering water. If the type of clay necessitates it, auxiliary additions of well known materials to prevent scum or efflorescence may be made; thus, for example, barium aluminate for the prevention of scum because of the presence of sulfates in the clay or in the water may be used without in any way interfering with the benefits to be derived from the use of sodium aluminate.

Aside from the permanency of the strength and the diminution of the weathering losses, other benefits have been noted; for example:—increased original kiln strength; increased glazability; improvement in the quality of the glaze; increase in the speed of the oxidation of the ware; decrease in the effect of variations in the composition of the tempering water; an increase in the effectiveness of barium compounds as a scum preventative; an increase in the kiln strength and decrease in deterioration, with a slight increase in the modulus of elasticity and decrease in drying warpage, when used conjointly with barium compounds; increase in resistance to thermal shock; and an increase in the firing range over which there is a constant volume. All of these benefits flow from the use of sodium aluminate in the ceramic ware.

It is to be understood that the present invention is strictly to be limited to such ceramic products as are out of the range of what are known as refractory products, these latter being fired at much higher temperatures than are the common clay products and subject to entirely different laws. It could not have been foreseen that the use of sodium aluminate in common clay products, such as sewer-pipe and the like, would be accompanied by such remarkable improvements, particularly in resistance to weathering losses, and it is for this particular purpose that the invention is of the greatest utility.

In order to demonstrate the remarkably unexpected results which flow from the use of sodium aluminate, considerable data has been collected, but only sufficient of such data will be incorporated herein to show the most outstanding advantage, namely, decrease in loss of strength due to weathering.

The clay used in proving the value of the present invention was what is known as No. 5 Lower Kittaning (Ohio No. 2) fire-clay, which is a clay that is found in the Uhrichsville, Ohio, district. This is the clay commonly used in making sewer-pipe. The sodium aluminate used was a dry sodium aluminate of approximately the formula equivalent to sodium meta-aluminate, $Na_2Al_2O_4$, which is the form of sodium aluminate found in commerce. The tests were made on glazed and unglazed test bars, which were 12″x1″x1″. These were fired to various cone temperatures, the best results being obtained in the laboratory, as well as on commercial scale, at between cone 6 and cone 8, and particularly at cone 8. The strengths given are in terms of the modulus of rupture. In the subjoined tables, the first column shows the amount of sodium aluminate added (the first item being without the same, using only water), the following items showing the percentage of the sodium aluminate added, from 0.05% up to and including 1%. The second column shows the modulus of rupture of the products shortly after they were taken from the kilns. The third column shows the modulus of rupture of an identical piece fired at the same time but exposed to an accelerated weathering test, as will be described, while the last column shows the percentage of loss in strength as a result of the weathering. The term "modulus of rupture" here is equivalent to the cross-breaking load. The weathering treatment consisted in treating the test bars to alternating conditions of a saturated steam atmosphere and a dry atmosphere. The steaming period was six hours in a closed chamber at approximately atmospheric pressure, followed by a drying period of approximately eighteen hours in a ventilated chamber. The test bars were subjected to nine cycles of alternating steam and drying. After the weathering treatment, the test bars were broken for weathering and strength diminution over a period of about ten days. Tests have been made at cone 01, cone 2, cone 4 and cone 8 in the laboratory and at cone 8 in the commercial kiln. In the commercial kiln the bars were both of the glazed and unglazed varieties. The results were as follows:

TABLE I

*Unglazed series in laboratory furnace at cone 8*

| Material added | Modulus of rupture directly from kiln | Modulus of rupture after weathering | Percentage loss of strength as result of weathering |
|---|---|---|---|
| None | 5555 | 4920 | 11.4 |
| .05% | 4915 | 4800 | 2.2 |
| .10% | 5315 | 4950 | 6.6 |
| .15% | 4830 | 4485 | 6.9 |
| .20% | 5025 | 4610 | 8.2 |
| .25% | 4585 | 4485 | 2.2 |
| .50% | 4820 | 4740 | 1.5 |
| 1.00% | 4775 | 4510 | 5.5 |

Table II shows the loss in strength of glazed test bars made in a commercial furnace at cone 8 and Table III similar bars unglazed in a commercial furnace at cone 8 fired at the same time that the glazed bars were fired, so that the results would be strictly comparable.

TABLE II

*Commercial, glazed, cone 8*

| Material added | Modulus of rupture directly from kiln | Modulus of rupture after weathering | Percentage loss of strength as result of weathering |
|---|---|---|---|
| None | 4175 | 2525 | 39.6 |
| .05% | 3720 | 2370 | 36.2 |
| .10% | 3680 | 2370 | 35.6 |
| .15% | 3670 | 2550 | 30.4 |
| .20% | 3725 | 2410 | 35.3 |
| .25% | 3790 | 2645 | 27.7 |
| .50% | 3740 | 3020 | 19.1 |
| 1.00% | 3880 | 3210 | 17.2 |

TABLE III

*Commercial, unglazed, cone 8*

| Material added | Modulus of rupture directly from kiln | Modulus of rupture after weathering | Percentage loss of strength as result of weathering |
|---|---|---|---|
| None | 4985 | 4085 | 18.2 |
| .05% | 4950 | 3780 | 23.6 |
| .10% | 4750 | 3980 | 16.1 |
| .15% | 4430 | 3370 | 24.7 |
| .20% | 4380 | 3715 | 15.1 |
| .25% | 4085 | 3245 | 19.6 |
| .50% | 4420 | 4060 | 8.22 |
| 1.00% | 4200 | 4130 | 1.7 |

From these tables it will be seen that without the addition of the chemical, loss of strength in the case of the unglazed laboratory fired material at cone 8 with 11.4%, while with 0.25% sodium aluminate this loss was reduced to 2.2%, and with 0.50% to 1.5%. At 1% the loss was somewhat greater, being 5.5%, and therefore about equivalent to the loss when using 0.10% and 0.15% of sodium aluminate. It thus appears that the percentage of sodium aluminate used is fairly critical, the best result lying between 0.25% and 1%. A somewhat similar relationship is shown in the case of the glazed bars, where without the addition of the chemical the loss was 39.6%, while with 0.25% of sodium aluminate it was only 27.7%, at 0.50% it was 19.1% and at 1% it was 17.2%. It will be noticed that the glazed ware is subject to some loss even though sodium aluminate is used, but the loss is better than cut in half as the result of the use of the aluminate. From Table III is will be seen that in the commercially fired unglazed bars fired at cone 8, the loss in strength without the addition of the chemical was 18.2%, and this dropped at the time .50% sodium aluminate was used to 8.22%, and with 1% to as low as 1.7%. Here again the best results are obtained between 0.25% and 1% of sodium aluminate. It should be understood that in all these tables the results given for any one figure are the averages of twelve determinations, so that the various columns are strictly comparable. Incidentally it was also discovered that the addition of sodium aluminate, particularly in quantities of 0.25% up to 1%, prevented the formation of what is known as black cores in the material. These black cores are believed to be the result of insufficient oxidation, and the carbonization of organic constituents of the clay. In the case of sodium aluminate in quantities of 0.25% or greater, none of the test bars had any black cores whatever, which is quite an advantage in producing uniform ware. There is thus an additional advantage in the use of sodium aluminate which could not have been predicted and which is an entirely unexpected and unforeseen result.

As a result of this work it was found that salt-glazing of the ceramic ware contributes markedly to the increase in weathering loss and that this loss can be cut down to less than 50% of the original loss by the use of the sodium aluminate.

Summing up the invention, it may be said that the use of sodium aluminate reduces the strength loss from weathering by from 50% to 80%, yielding these results within the feasible economical range of concentration of the sodium aluminate. Sodium aluminate also progressively minimizes to the point of elimination the characteristic strength loss due to early over-firing of the ware. The sodium aluminate increases the kiln strength at the proper firing temperatures and improves the drying behavior. It also minimizes the effect of variations in material and processing operations and particularly reduces the injurious effect of salt-glazing. From the absence of black cores it is to be inferred that the sodium aluminate also facilitates the oxidation rate.

No details relative to the method of mixing are really necessary, because the mixing is that followed in the art in general and is well known to everyone skilled in the manufacture of ceramic products. However, for purposes of completness it may be stated that the test samples which form the basis for the above tables were tempered in a small wet-mill and formed immediately after tempering, whereafter each batch was run through a small auger machine once, without the die, so as to obtain a sample as nearly uniform as possible. The strength tests were the standard A. S. T. M. methods, so they can be duplicated by anyone familiar with these well known standard testing methods and devices.

While sodium aluminate is the preferred form of aluminate, it is obvious that other water-soluble aluminates such as potassium and lithium aluminates would be the chemical equivalents for the purpose, although at the writing of the present specification the cost of these aluminates is so high as to make them commercially undesirable.

What it is desired to protect by Letters Patent is:

1. The process of making weathering-resistant ceramic pipe intended for underground use which comprises tempering fire-clay with water containing an amount of sodium aluminate not substantially exceeding 1% of the weight of the clay, forming the resulting plastic mass into shape, drying the shape and firing it at a temperature equivalent to about cone 8.

2. The process of inhibiting the deterioration of ceramic pipe intended for underground use and the like under the influence of the weather and the leaching action of water which comprises tempering fire-clay with water containing an amount of sodium aluminate not substantially exceeding 1% of the weight of the clay, forming the resulting plastic mass into shape, drying the shape and firing it at a temperature about equivalent to cone 8.

3. Ceramic pipe intended for underground use made from fire-clay and not substantially exceeding 1.0% of sodium aluminate, characterized by resistance to loss in strength as the result of weathering.

WILLARD K. CARTER.
GEORGE H. DUNCOMBE, Jr.